United States Patent
Seksaria et al.

(10) Patent No.: US 7,243,748 B2
(45) Date of Patent: Jul. 17, 2007

(54) STARTUP INTERLOCK FOR VEHICLE ELECTRIC DRIVE SYSTEM

(75) Inventors: Arun Kumar Seksaria, Cedar Falls, IA (US); Mervin Peter Kizlyk, Cedar Falls, IA (US); Robert Eugene Kasten, Denver, CO (US)

(73) Assignee: Deere & Company, Moline, IL (US)

( * ) Notice: Subject to any disclaimer, the term of this patent is extended or adjusted under 35 U.S.C. 154(b) by 388 days.

(21) Appl. No.: 11/029,237

(22) Filed: Jan. 4, 2005

(65) Prior Publication Data

US 2006/0148613 A1 Jul. 6, 2006

(51) Int. Cl.
*B60W 20/00* (2006.01)

(52) U.S. Cl. ............ 180/65.3; 180/65.8; 903/941; 903/942

(58) Field of Classification Search ......... 180/65.2, 180/65.3, 65.8; 903/941, 942
See application file for complete search history.

(56) References Cited

U.S. PATENT DOCUMENTS

| | | | |
|---|---|---|---|
| 5,809,441 A * | 9/1998 | McKee ................. 701/51 |
| 6,253,127 B1 * | 6/2001 | Itoyama et al. ........... 701/22 |
| 6,492,785 B1 | 12/2002 | Kasten et al. ........... 318/434 |
| 6,494,809 B1 * | 12/2002 | Suzuki et al. ........... 477/107 |
| 6,722,332 B2 * | 4/2004 | Kojima ................. 123/179.3 |
| 6,722,457 B2 * | 4/2004 | Yamaguchi et al. ....... 180/65.2 |
| 6,763,903 B2 * | 7/2004 | Morimoto et al. ........ 180/65.2 |
| 6,794,765 B2 * | 9/2004 | Izumiura et al. ........ 290/38 R |
| 6,994,177 B2 * | 2/2006 | Ito et al. .............. 180/65.2 |
| 7,003,395 B1 * | 2/2006 | Thompson et al. ........ 701/113 |
| 7,013,213 B2 * | 3/2006 | McGee et al. .......... 701/113 |
| 7,036,477 B1 * | 5/2006 | Thompson et al. ....... 123/179.4 |
| 7,079,942 B2 * | 7/2006 | McGee et al. .......... 701/113 |
| 7,168,515 B2 * | 1/2007 | Ito et al. .............. 180/65.2 |
| 2002/0050259 A1 * | 5/2002 | Kojima ................. 123/179.3 |
| 2002/0179348 A1 * | 12/2002 | Tamai et al. ........... 180/65.2 |
| 2006/0085120 A1 * | 4/2006 | McGee et al. .......... 701/113 |
| 2006/0089234 A1 * | 4/2006 | Ogawa ................. 477/107 |

FOREIGN PATENT DOCUMENTS

DE 19729354 1/1998

\* cited by examiner

*Primary Examiner*—Jeff Restifo

(57) ABSTRACT

A vehicle electric drive system has an internal combustion engine which drives an electric generator. The generator powers a motor which drives the wheels. The system has operator controls including a speed control member movable from a zero speed position to a high speed position, an FNR direction control member having forward, neutral and reverse positions. The system also includes a wheel speed sensor and an electronic control unit. Upon startup, the control unit senses the position of the direction control member, senses wheel speed, and senses position of the speed control member. The controller prevents vehicle operation if the direction control member is not in its neutral position, or the sensed wheel speed is not close to zero, or the speed control member is not near its zero speed position. The controller permits vehicle operation if the direction control member is in its neutral position, and the sensed wheel speed is close to zero, and the speed control member is near its zero speed position.

2 Claims, 2 Drawing Sheets

STARTUP INTERLOCK FOR VEHICLE ELECTRIC DRIVE SYSTEM

BACKGROUND

This invention relates to an electric drive system for a vehicle.

Vehicle electric drive systems or AC electric traction drives have been proposed to overcome some of the deficiencies of mechanical transmission systems, such as a limited number of speeds, increased costs of engineering and manufacturing components, and limiting vehicle configuration options. One such hybrid electric drive system for a vehicle is described in U.S. Pat. No. 6,492,785, issued 10 Dec. 2002 and assigned to the assignee of this application. This hybrid electric drive system includes an engine driven electrical generator and electric motors for driving the traction wheels or belts, and for driving auxiliary power units such as the PTO or fan drives.

This hybrid electric drive system also includes a speed control pedal, and a forward-neutral-reverse directional control lever. With such controls, the operator can select one of several operating modes, including a mode wherein vehicle motion can be initiated by switching the directional control into the forward or reverse position and moving the speed control into a non-zero speed position. In this mode, the operator may quickly reverse direction by simply switching the directional control to the opposite direction. This is useful, for example, when operating a loader, where it is desirable to change direction quickly and often.

Both conventional tractors and tractors with infinitely variable transmissions (IVT) employ interlocks to prevent the operator from inadvertently starting the tractor in an unsafe condition. For example, many tractors sense transmission gear engagement and prevent the engine from starting if the transmission is engaged. Such an interlock cannot be used with a hybrid electric vehicle, because there is not a transmission with a gear ratio to be sensed.

SUMMARY

Accordingly, an object of this invention is to provide a vehicle hybrid electric drive system with an interlock feature which prevents an operator from inadvertently operating the vehicle in a startup situation.

These and other objects are achieved by the present invention, wherein a vehicle electric drive system has an internal combustion engine, an electric generator driven by the engine, a first inverter/rectifier coupled to the generator, a buss coupled to the first inverter/rectifier, a second inverter/rectifier coupled to the buss, and a traction motor coupled to an output of the second inverter/rectifier and driving a wheel. The system also includes an operator speed control member movable from a zero speed position to a high speed position, an operator FNR direction control member having forward, neutral and reverse positions, a wheel speed sensor, and a controller coupled to the second inverter/rectifier for controlling a current output of the second inverter/rectifier as a function of a position of the speed and direction control members.

Upon startup, the controller senses the position of the direction control member, senses wheel speed, and senses position of the speed control member. The controller prevents vehicle operation if the direction control member is not in its neutral position, or the sensed wheel speed is not close to zero, or the speed control member is not near its zero speed position. The controller permits vehicle operation if the direction control member is in its neutral position, and the sensed wheel speed is close to zero, and the speed control member is near its zero speed position.

As a result, before power transmission to the drive wheels is enabled, vehicle speed and commanded speed must be at or near zero when the FNR control is initially shifted out of neutral. This helps prevent sudden and unexpected vehicle acceleration at initial startup.

DETAILED DESCRIPTION

Figure 1:
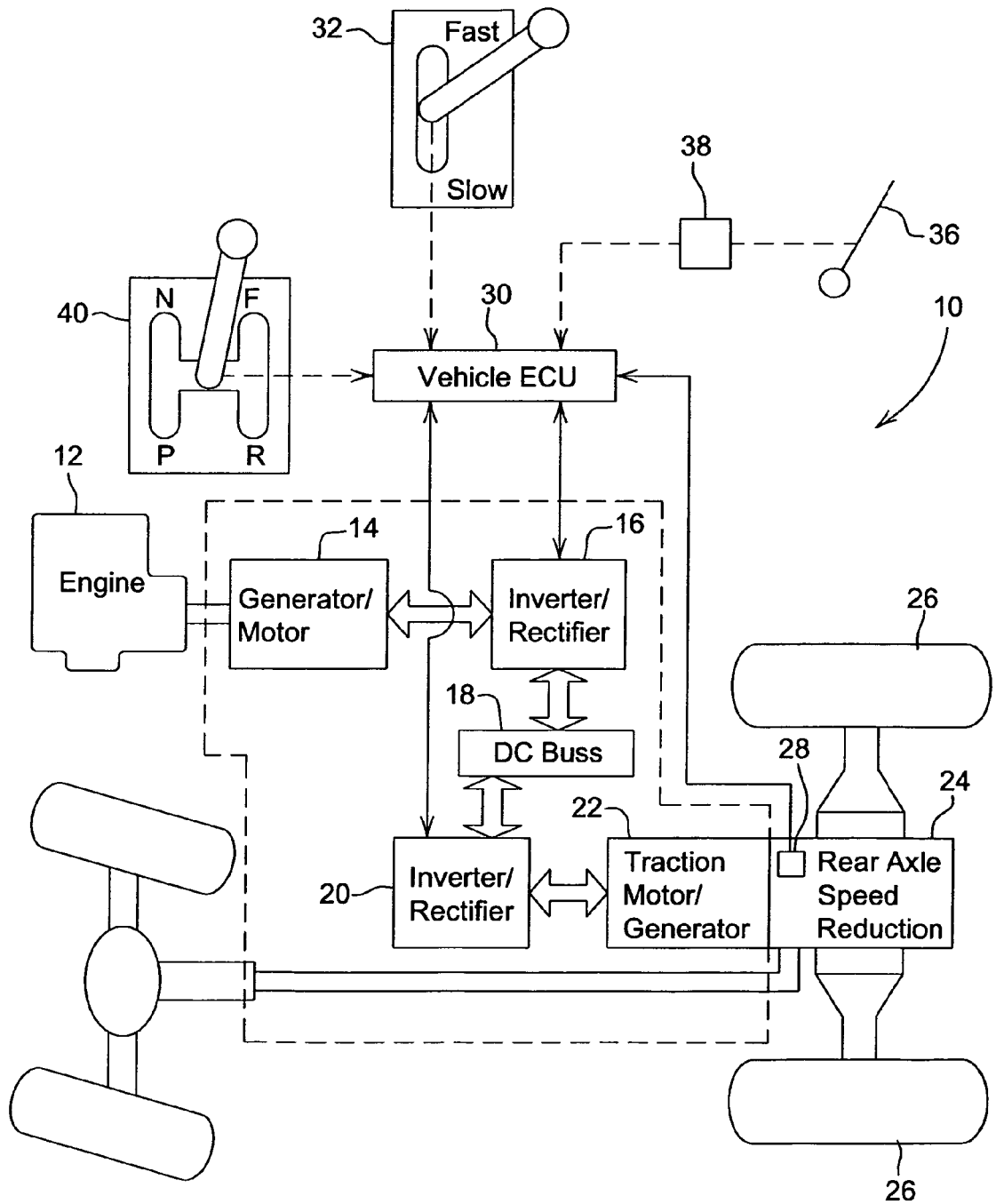
FIG. 1 is a simplified schematic diagram of a vehicle electric drive system according to the present invention.

Referring to FIG. 1, a vehicle electric drive system 10 includes an internal combustion engine 12, such as a compression ignition engine. The engine 12 drives an electric generator 14 which supplies electrical power to an inverter/rectifier 16. Inverter/rectifier 16 supplies electrical power to a high voltage DC buss 18. The buss 18 feeds power to inverter/rectifier 20. Inverter/rectifier 20 supplies power to traction motor 22 which drives rear wheels 26 via axle speed reduction unit 24. Unit 24 houses a speed sensor 28 which provides a vehicle speed signal to a vehicle electrical control unit ECU 30. Each inverter 16, 20 is controlled by the ECU 30.

The generator 14 is preferably a 3-phase electric generator and may be a generator/motor, and inverter/rectifier 16 may be bi-directional. The motor 22 is preferably a 3-phase electric motor and may be a motor/generator, and inverter/rectifier 20 may be bi-directional.

A speed command lever 32 is coupled to vehicle ECU 30. A speed command pedal 36 is coupled to vehicle ECU 30. Lever 32 and pedal 36 may be used by an operator to set a desired vehicle speed, such as in a range of zero to 50 kilometers per hour. A forward-neutral-reverse (FNR) directional control lever unit 40 is coupled to vehicle ECU 30. A suitable lever, pedal and FNR directional control lever unit are currently known and used on production John Deere 7820 and 7720 tractors with infinitely variable transmissions. Units 32, 36 and 40 include transducers (not shown) which provide ECU 30 with signals representing the position of the respective control member.

Figure 2:
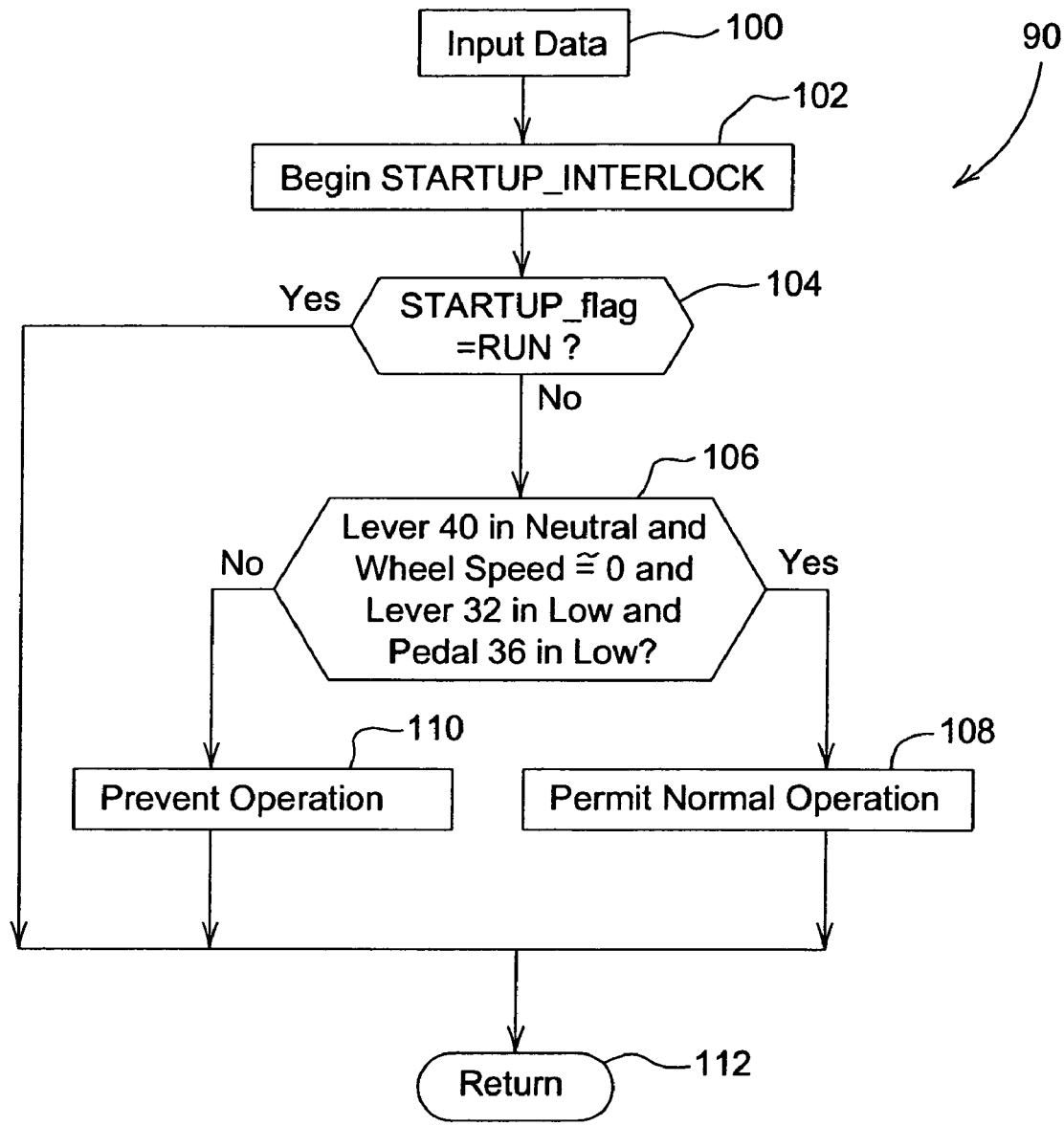
FIG. 2 is a logic flow diagram of an algorithm executed by the vehicle ECU of the control system of FIG. 1.

The ECU 30, upon system startup, executes a program 90 represented by FIG. 2. Upon power start up, program 90 performs an initialization or data input step 100, which initializes a STARTUP flag to STARTUP, obtains a wheel speed signal from sensor 28, a speed command signal from speed command lever 32, a speed command signal from speed command pedal 36, and a directional control signal from FNR control 40. Thereafter, a startup lockout subroutine or algorithm begins at step 102 when called from a main algorithm (not shown).

Step 104 directs the algorithm to exit at step 112 if the STARTUP_flag is set to RUN, else to step 106.

Step 106 directs the algorithm to step 108 if the FNR lever 40 is in its neutral position, and the sensed wheel speed from sensor 20 is near zero, and speed control lever 32 is close to or in its slowest speed position, and the pedal 36 is close to or in its slowest speed position. If any of these conditions are not met, then step 106 directs control to step 110.

Step 108 permits normal operation (by setting various flags and parameters (not shown)), so that the vehicle can be moved forward or in reverse as a result of operation of controls 32, 36 and 40.

As a result, before power transmission to the drive wheels is enabled, vehicle speed and commanded speed must be at or near zero when the FNR control is initially shifted out of neutral. This helps prevent sudden and unexpected vehicle acceleration at initial startup.

Step 110 sets various flags and parameters (not shown) so that normal operation is thereafter prevented—the vehicle is prevented from being moved forward or in reverse as a result of operation of controls 32, 36 and 40.

Step 112 ends this subroutine and returns control to the main control algorithm (not shown).

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In vehicle electric drive systems having an internal combustion engine, an electric generator driven by the engine, a first inverter/rectifier coupled to the generator, a buss coupled to the first inverter/rectifier, a second inverter/rectifier coupled to the buss, and a traction motor coupled to an output of the second inverter/rectifier and driving a wheel, an operator speed command member movable from a zero speed position to a high speed position, an operator direction control member having forward, neutral and reverse positions, and a controller coupled to the second inverter/rectifier for controlling a current output of the second inverter/rectifier as a function of a position of the speed and direction control members, a startup interlock method:

upon startup, sensing position of the direction control member, sensing wheel speed, and sensing position of the speed command member;

preventing vehicle operation if the direction control member is not in its neutral position, or the sensed wheel speed is not close to zero, or the speed command member is not near its zero speed position; and permitting vehicle operation if the direction control member is in its neutral position, and the sensed wheel speed is close to zero, and the speed command member is near its zero speed position.

2. In vehicle electric drive systems having an internal combustion engine, an electric generator driven by the engine, a first inverter/rectifier coupled to the generator, a buss coupled to the first inverter/rectifier, a second inverter/rectifier coupled to the buss, and a traction motor coupled to an output of the second inverter/rectifier and driving a wheel, an operator speed command lever movable from a zero speed position to a high speed position, an operator speed command pedal movable from a zero speed position to a high speed position, an operator direction control member having forward, neutral and reverse positions, and a controller coupled to the second inverter/rectifier for controlling a current output of the second inverter/rectifier as a function of positions of the speed command lever, the speed command pedal and the direction control member, a startup interlock method:

upon startup, sensing position of the direction control member, sensing wheel speed, sensing position of the speed command lever, and sensing position of the speed command pedal;

preventing vehicle operation if the direction control member is not in its neutral position, or the sensed wheel speed is not close to zero, or the speed command lever is not near its zero speed position, or the speed command pedal is not near its zero speed position; and permitting vehicle operation if the direction control member is in its neutral position, and the sensed wheel speed is close to zero, and the speed command lever is near its zero speed position, and the speed command pedal is near its zero speed position.

* * * * *